United States Patent
Zhou et al.

(10) Patent No.: US 12,328,623 B2
(45) Date of Patent: Jun. 10, 2025

(54) METHOD AND DEVICE FOR DATA FORWARDING

(71) Applicant: DATANG MOBILE COMMUNICATIONS EQUIPMENT CO., LTD., Beijing (CN)

(72) Inventors: Ye Zhou, Beijing (CN); Aijuan Liu, Beijing (CN); Ying Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 353 days.

(21) Appl. No.: 17/439,079

(22) PCT Filed: Feb. 27, 2020

(86) PCT No.: PCT/CN2020/077040
§ 371 (c)(1),
(2) Date: Sep. 14, 2021

(87) PCT Pub. No.: WO2020/192352
PCT Pub. Date: Oct. 1, 2020

(65) Prior Publication Data
US 2022/0159520 A1    May 19, 2022

(30) Foreign Application Priority Data
Mar. 28, 2019 (CN) .......................... 201910244888.6

(51) Int. Cl.
*H04W 36/00* (2009.01)
*H04W 36/02* (2009.01)
*H04W 36/08* (2009.01)

(52) U.S. Cl.
CPC ... *H04W 36/0027* (2013.01); *H04W 36/0069* (2018.08); *H04W 36/02* (2013.01); *H04W 36/08* (2013.01)

(58) Field of Classification Search
None
See application file for complete search history.

(56) References Cited

U.S. PATENT DOCUMENTS

| 9,100,883 B2 | 8/2015 | Bontu et al. |
| 9,888,412 B2 | 2/2018 | Ke et al. |

(Continued)

FOREIGN PATENT DOCUMENTS

| CA | 3030542 A1 | 7/2018 |
| CN | 104378793 A | 2/2015 |

(Continued)

OTHER PUBLICATIONS

International Search Report issued in PCT/CN2020/077040, mailed May 26, 2020.

(Continued)

*Primary Examiner* — Hong Shao
(74) *Attorney, Agent, or Firm* — Meunier Carlin & Curfman LLC

(57) ABSTRACT

Disclosed in the present application are a method and device for data forwarding. The method includes: sending to a second wireless access network node a first interface message requesting to modify the node; receiving a second interface message returned by the second wireless access network node, where the information in the second interface message includes first radio resource control (RRC) configuration information and first data forwarding and distribution information used for indicating first data that needs data forwarding; and sending a third interface message carrying the information in the second interface message to a third wireless access network node, to request the third wireless access network node to receive the first data forwarded from the second wireless access network node.

16 Claims, 7 Drawing Sheets

(56) References Cited

U.S. PATENT DOCUMENTS

| | | | |
|---|---|---|---|
| 9,906,994 | B2 | 2/2018 | He et al. |
| 10,595,239 | B2 | 3/2020 | Wu et al. |
| 2016/0198517 | A1 | 7/2016 | Du et al. |
| 2018/0115926 | A1* | 4/2018 | Wu .................. H04W 36/08 |
| 2019/0357093 | A1* | 11/2019 | Xu .................... H04W 36/08 |
| 2020/0389810 | A1* | 12/2020 | Wang ............ H04W 28/0268 |

FOREIGN PATENT DOCUMENTS

| | | |
|---|---|---|
| CN | 104378842 A | 2/2015 |
| CN | 104812008 A | 7/2015 |
| CN | 106162765 A | 11/2016 |
| CN | 106941700 A | 7/2017 |
| CN | 106941733 A | 7/2017 |
| CN | 109429267 A | 3/2019 |
| WO | 2015105353 A1 | 7/2015 |
| WO | 2018232124 A1 | 12/2018 |
| WO | 2020191058 A1 | 9/2020 |

OTHER PUBLICATIONS

Technical Specification Group Radio Access Network: Evolved Universal Terrestrial Radio Access (E-UTRA) and NR: Multi-connectivity, 3gpp, 3GPP TS 37.640 V15. 3.0, 10 pages (Sep. 2018).

Huawei, "(TP for NR BL CR for TS 37.340) Data forwarding for MR-DC," 3GPP TSG-RAN3 Meeting #101-bis, R3-185814, Chengdu, China, Oct. 8-12 (2018).

Huawei, Clarification on DRB level offloading in MR-DC with 5GC, 3GPP TSG-RAN3 Meeting #103, R3-190513, Athens, Greece, Feb. 25-Mar. 1 (2019).

Ericsson, Data volume reporting for MR-DC with 5GC, 3GPP TSG-RAN WG2 Meeting #105, R2-1902758 was R3-190934, Athens, Greece, Feb. 25-Mar. 1 (2019).

* cited by examiner

METHOD AND DEVICE FOR DATA FORWARDING

CROSS-REFERENCE TO RELATED APPLICATIONS

The present application is a National Stage of International Application No. PCT/CN2020/077040, filed on Feb. 27, 2020, which claims priority to the Chinese Patent Application No. 201910244888.6, filed to China Patent Office on Mar. 28, 2019, and entitled "METHOD AND DEVICE FOR DATA FORWARDING", the entire contents of which are incorporated herein by reference.

FIELD

The present application relates to the field of wireless communications, in particular to a method and device for data forwarding.

BACKGROUND

After a dual connectivity (DC) function is introduced into a Release-12 version of a long term evolution (LTE) system, the function has been used in a 5G system. In a 5G/new radio (5G/NR) DC architecture, a user terminal uses resources of two radio access network nodes for data transmission at the same time. A node which is in control plane connection with a core network is a master node (MN) and the other node is a secondary node or slave node (SN).

In a DC scenario connected to a 5G core (5GC) in the related art, when an MN-triggered handover operation or an MN-triggered SN change operation is executed, if a source node side is in a DC state, before a source MN sends a handover request message to a target node or the source MN sends an addition request message to a target SN, there are defects as follows.

On the one hand, a mapping relationship between a quality of service (QoS) flow and a data radio bearer (DRB) terminated in the SN cannot be obtained through an Xn application protocol (XnAP) interface IE.

On the other hand, data flow that needs data forwarding of QoS or the DRB terminated in a source SN cannot be obtained.

Therefore, in an existing 5GC DC scenario, a forwarding request in the handover request message sent by the source MN to the target node or a forwarding suggestion IE in the addition request message sent by the source MN to the target SN cannot be correctly filled in.

SUMMARY

The present application provides a method and device for data forwarding. The method and device are applied to a dual connectivity (DC) scenario of a 5GC where a secondary node receives an interface message sent by a master node and sends a data forwarding suggestion to the master node so that data forwarding can still be performed correctly in the process of switching nodes or changing the secondary node.

In a first aspect, the present application provides a method for data forwarding. The method is applied to a first radio access network node and includes: sending, to a second radio access network node, a first interface message requesting to modify a node; receiving a second interface message returned by the second radio access network node, where the second interface message includes first radio resource control (RRC) configuration information and first data forwarding and distribution information used for indicating first data that needs data forwarding; and sending a third interface message carrying the second interface message to a third radio access network node, and requesting the third radio access network node to receive the first data forwarded from the second radio access network node.

In a 5GC DC scenario, a source secondary node receives a first interface message sent by a source master node. The interface message, under the condition that a packet data convergence protocol (PDCP) layer corresponding to at least a part of data flows is transferred from the source secondary node to a target node, data forwarding information is sent to the source master node to notify the source master node of the data forwarding and distribution information sent from the source secondary node, and the source master node is notified of data that needs data forwarding, so that in a scenario where a terminal is switched from the source master node and the source secondary node to the target node or the source secondary node where the terminal is located is changed into a target secondary node, the source master node can correctly fill in a data forwarding request in a handover request message or a secondary node addition request message, and therefore data forwarding can be correctly performed.

In the second aspect, the present application provides a method for data forwarding. The method is applied to a second radio access network node and includes: receiving a first interface message requesting to modify a node sent by a first radio access network node; sending a second interface message to the first radio access network node, where the second interface message includes first radio resource control (RRC) configuration information and first data forwarding and distribution information used for indicating first data that needs data forwarding; and forwarding the first data from the second radio access network node to a radio access network node where a forwarding address is located.

In the third aspect, the present application provides a device for data forwarding, where the device is a device where a first radio access network node is located and the device includes: a processor and a memory, and the processor is configured to execute program codes stored in the memory to: sending a first interface message requesting to modify a node to a second radio access network node; receive a second interface message returned by the second radio access network node, where the second interface message includes first radio resource control (RRC) configuration information and first data forwarding and distribution information used for indicating first data that needs data forwarding; and send a third interface message carrying the second interface message to a third radio access network node, and request the third radio access network node to receive the first data forwarded from the second radio access network node.

In the fourth aspect, the present application provides a device for data forwarding, where the device is a device where a secondary node is located and the device includes: a processor and a memory, the processor is configured to execute program codes stored in the memory to: receive a first interface message requesting to modify a node sent by a first radio access network node; send a second interface message to the first radio access network node, wherein the second interface message includes first radio resource control (RRC) configuration information and first data forwarding and distribution information used for indicating first data that needs data forwarding; and forward the first data from the second radio access network node to a radio access network node where a forwarding address is located.

In the fifth aspect, the present application provides a device for data forwarding, wherein the device is a device where a first radio access network node is located and the device includes: a modification request sending module, a forwarding information receiving module and a data forwarding requesting module.

The modification request sending module is configured to send a first interface message requesting to modify a node to a second radio access network node.

The forwarding information receiving module is configured to receive a second interface message returned by the second radio access network node, where second interface message includes first radio resource control (RRC) configuration information and first data forwarding and distribution information used for indicating first data that needs data forwarding.

The data forwarding requesting module is configured to send a third interface message carrying the second interface message to a third radio access network node, and request the third radio access network node to receive the first data forwarded from the second radio access network node.

In the sixth aspect, the present application provides a device for data forwarding, where the device is a device where a second radio access network node is located and the device includes: a modification request receiving module, a forwarding information sending module and a data forwarding executing module.

The modification request receiving module is configured to receive a first interface message requesting to modify a node sent by a first radio access network node.

The forwarding information sending module is configured to send a second interface message to the first radio access network node, where the second interface message includes first radio resource control (RRC) configuration information and first data forwarding and distribution information used for indicating first data that needs data forwarding.

The data forwarding executing module is configured to forward the first data from the second radio access network node to a radio access network node where a forwarding address is located.

In the seventh aspect, the present application provides a computer storage medium storing computer programs, and the computer programs are executed by a processing element to perform steps of any method provided in the first aspect.

In the eighth aspect, the present application provides a computer storage medium storing computer programs, and the computer programs are executed by a processing element to perform steps of any method provided in the second aspect.

Further, for technical effects brought by any one of the implementations from the second aspect to the eighth aspect of the present application, reference may be made to technical effects brought by different implementations in the first aspect of the present application, and repeated descriptions will not be made here.

BRIEF DESCRIPTION OF THE DRAWINGS

To explain more clearly the technical solutions in the embodiments of the present application, the following will briefly introduce the figures needed in the description of the embodiments. Obviously, for those of ordinary skill in the art, other figures may also be obtained based on these figures without paying any creative effort.

DETAILED DESCRIPTION OF THE EMBODIMENTS

In order to make the objectives, technical solutions, and advantages of the present application clearer, the present application will be further described in detail below in conjunction with the accompanying drawings. Obviously, the described embodiments are only a part of the embodiments of the present application, rather than all of the embodiments. Based on the embodiments in the present application, all other embodiments obtained by those of ordinary skill in the art without creative work shall fall within the protection scope of the present application.

Application scenarios described in the embodiments of the present application are intended to more clearly illustrate the technical solutions of the embodiments of the present application, and do not constitute a limitation on the technical solutions provided in the embodiments of the present application. Those of ordinary skill in the art will know that as new application scenarios emerge, the technical solutions provided in the embodiments of the present application are equally applicable to similar technical problems.

Figure 1:
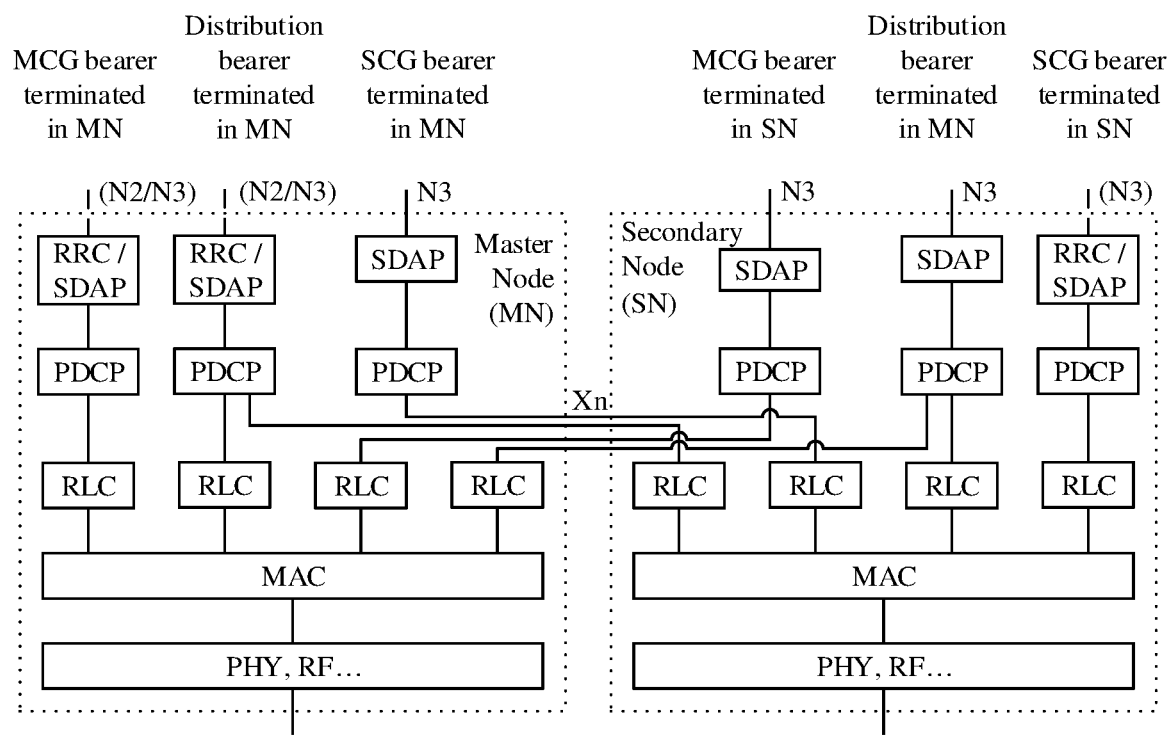
FIG. 1 is a schematic structural diagram of a new radio dual connectivity (NR DC) provided by an embodiment of the present application.

As shown in FIG. 1, an application scenario of an embodiment of the present application is a 5G/NR dual connectivity architecture.

In the 5G/NR dual connectivity architecture, a user terminal uses resources of two radio access network nodes for data transmission at the same time. The user terminal performs data transmission between a master node and a secondary node through an Xn interface. The node connected to a core network through a control plane is called the master node (MN), and the other node is called the secondary node (SN). When a data flow corresponding to a packet data convergence protocol (PDCP) layer is transferred from the SN to other nodes, the MN cannot obtain data information of the SN requiring data forwarding from the SN through an Xn application protocol (XnAP) interface IE, and a mapping relationship between a quality of service (QoS) flow and a data radio bearer (DRB) terminated in the SN cannot be obtained, so the MN cannot correctly fill in data forwarding information in a handover request message or in a secondary node addition request message.

Based on the problems in the above scenario, there are three types of radio access network nodes in a wireless network, namely, a first radio access network node, a second radio access network node, and a third radio access network node. The first radio access network node is connected to the second radio access network node, and the first radio access network node is connected to the third radio access network node, and when change or handover of any one of the above-mentioned radio access network nodes is triggered, the present application provides a method for data forwarding, which can receive data forwarding and distribution information carried by a radio access network node that needs to perform data forwarding and correctly forward data that needs data forwarding in the radio access network node from the radio access network node to a radio access network node where a forwarding address is located. The method solves the above technical problems. The embodiments provided by the present application are not limited to the above scenario, and technical problems similar to the above scenarios can be solved by an implementation method provided by the present application.

In order to ensure on-demand delivery of user data, when a data forwarding mechanism is enabled, a target node should first send forwarded user data to a terminal, and after receiving an end identifier, the target node should send user data received by itself to the terminal. For example, for downlink data forwarding, the target node should first send to a user terminal user data it receives from a source node, and then send user data it receives from a core network. If the target node provides the source node (including a source MN or a source SN) a forwarding transmission address, the source node must provide forwarded user data for the target node, or otherwise the target node will not be able to determine whether to send the user data it receives to the terminal.

Therefore, in the embodiments provided by the present application, before the target node provides the forwarding transmission address used for the forwarded data, the source node first determines which user data needs data forwarding based on received data forwarding and classification information, and then sends a request message to the target node. The source node forwards the data that needs data forwarding from a secondary node to the target node, and the source node will not forward a data flow that does not request data forwarding.

Embodiment 1

The present application provides a system for data forwarding. The system includes: a first radio access network node, a second radio access network node and a third radio access network node. Information in a data forwarding process is exchanged among the above three types of radio access network nodes. The specific process is as follows.

1) The first radio access network node sends, to the second radio access network node, a first interface message requesting to modify the node.

The first interface message includes a configuration inquiry instruction for requesting current RRC configuration of the second radio access network node.

2) The first radio access network node receives a second interface message returned by the second radio access network node. The second interface message includes first radio resource control (RRC) configuration information and first data forwarding and distribution information used for indicating first data that needs data forwarding.

The second interface message further includes a mapping relationship between the first data and a data radio bearer (DRB), which is used for the first radio access network node to request the third radio access network node to, according to the mapping relationship between the first data and the DRB, receive the first data forwarded from the second radio access network node at granularity of the DRB.

3) The first radio access network node sends, to the third radio access network node, a third interface message carrying the second interface message, to request the third radio access network node to receive the first data forwarded from the second radio access network node.

Specifically, a fourth interface message carrying forwarding address information returned by the third access network node is received; and the forwarding address information is sent to the second radio access network node through a fifth interface message, and the first data is received from the second radio access network node and is forwarded to the third radio access network node.

The radio access network nodes provided in the embodiments of the present application including but not limited to: a 5G base station (e.g. gNB), a 4G base station (e.g. evolved NodeB, eNB), a 3G base station (e.g. NodeB, NB), or a logic node provided with a part or all functions of the base stations.

According to difference of scenarios, the radio access network nodes provided in the above embodiments of the present application may be a source main node, a source secondary node, a target node, or a target secondary node. No excessive limitations are made to the first radio access network node, the second radio access network node, and the third radio access network node.

The embodiments of the present application provide two application scenarios for data forwarding as follows.

Scenario 1, the first radio access network node triggers the update of the second radio access network node to the third radio access network node, and forwards the first data of the second radio access network node to the third radio access network node.

Scenario 2, the first radio access network node triggers the handover of the second radio access network node to the third radio access network node, the first data of the second radio access network node and/or second data of the first radio access network node are forwarded to the third radio access network node.

The following is an explanation of the above scenarios.

Scenario 1, the first radio access network node triggers the update of the second radio access network node to the third radio access network node, and forwards the first data of the second radio access network node to the third radio access network node.

In this case, the first radio access network node where a terminal is located remains unchanged, the second radio access network node where the terminal is located is changed to the third radio access network node, and after the first radio access network node receives the fourth interface message carrying the forwarding address information returned by the third radio access network node, the first radio access network node sends the forwarding address information to the second radio access network node, receives the first data from the second radio access network node and forwards the received first data to the third radio access network node.

After the first radio access network node receives the fourth interface message carrying the forwarding address information returned by the third radio access network node, the method further includes that the first radio access network node instructs the second radio access network node to release a RRC connection of a user terminal UE, and performs RRC reconfiguration to connect the UE to the second radio access network node.

After the first access network node requests the second radio access network node to release the RRC connection of the user terminal UE, the method further includes that the first radio access network node sends a sending sequence number status of the first data to the third radio access network node.

Afterwards, the second radio access network node starts to forward data to the third radio access network node; the first radio access network node requests a core network to convert paths of uplink and downlink user data, and after the core network converts the paths of the uplink and downlink user data, the first radio access network node sends an end identifier to the second radio access network node; the second radio access network node forwards the end identifier to the third radio access network node; the first radio access network node instructs the second radio access network node to release context data of the user terminal; and the second radio access network node releases the context data of the user terminal after data forwarding is completed, and the user terminal in a dual connectivity state exchanges data with the core network through the first radio access network node and the third radio access network node.

The processes of the above scenario 1 will be described in detail below in conjunction with specific application scenarios.

Figure 2:
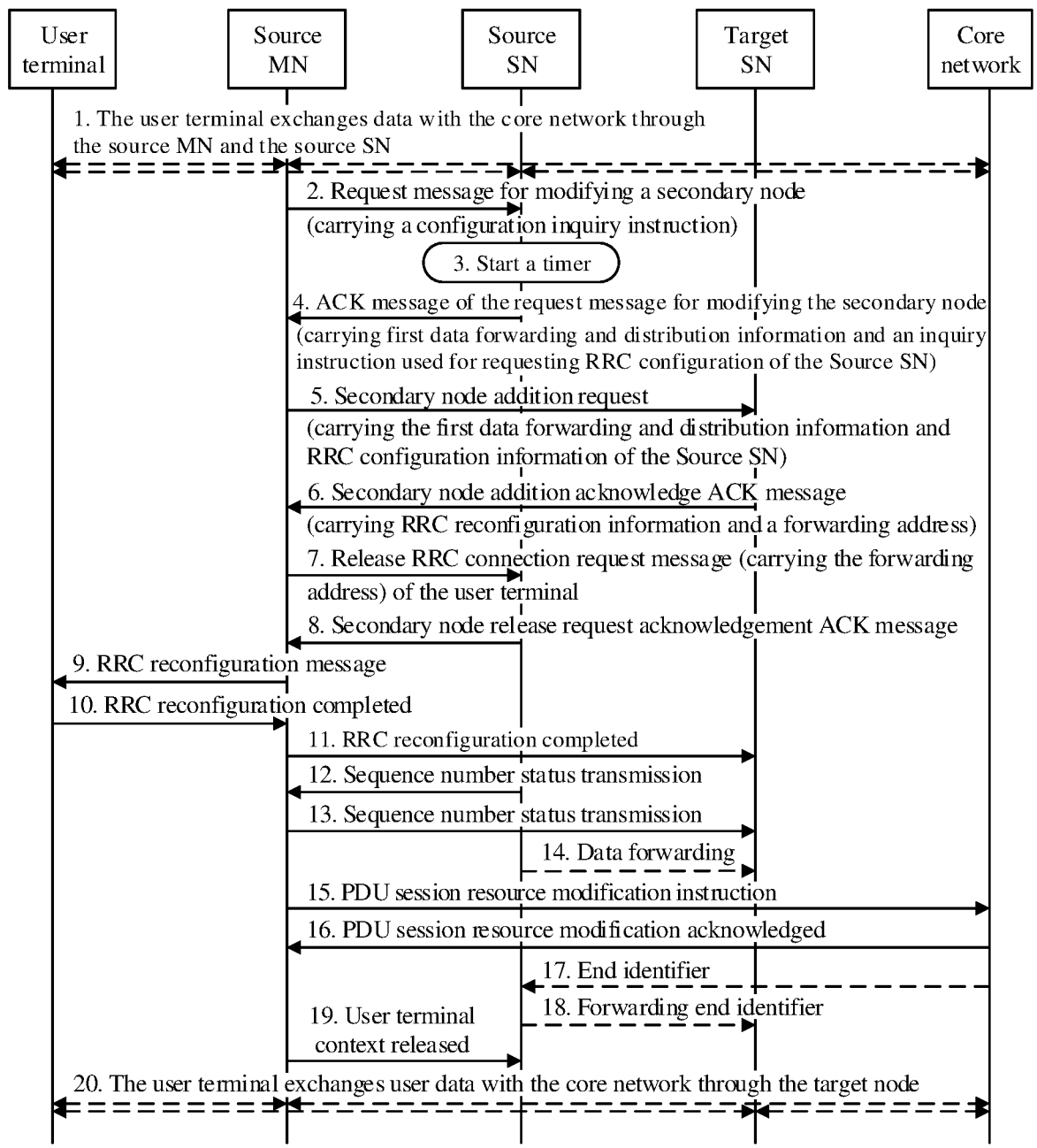
FIG. 2 is a flow diagram of data forwarding in a first scenario provided by an embodiment of the present application.

As shown in FIG. 2, the first radio access network node is the source MN, the second radio access network node is the source SN, the third radio access network node is the target SN, and the system further includes the user terminal and the core network.

In an application scenario, the source MN where the user terminal is located remains unchanged, and the SN is changed from the source SN to the target SN.

Step 1: the user terminal is in a dual connectivity state, and exchanges data with the core network through the source MN and the source SN.

Step 2: the source MN triggers a secondary node change process and sends a secondary node modification request message to the source SN. The secondary node modification request message carries a configuration inquiry instruction for inquiring about current RRC configuration of the source SN, and the configuration inquiry instruction is an SCG configuration inquiry instruction.

Step 3: optionally, when the source SN receives the above-mentioned secondary node modification request message, a timer is started, and the configuration of the source SN is no longer changed before the timer expires.

Step 4: when the source SN receives the above-mentioned secondary node modification request message, the source SN feeds back an acknowledgement (ACK) message for the secondary node modification request message to the source MN. The ACK message carries the first data forwarding and distribution information and RRC configuration information of the source SN.

The data forwarding and distribution information indicates which user data flow needs data forwarding under the condition that data forwarding can be performed. The data forwarding and distribution information further carries a mapping relationship between a data flow and a radio bearer, and indicates data forwarding of the data flow to be executed at the granularity of DRB.

Step 5: the source MN sends a secondary node addition request message to the target SN to update the source SN where the user terminal is located to the target SN. The secondary node addition request message carries the first data forwarding and distribution information received by the source MN in step 4 and the RRC configuration information of the source SN.

Step 6: the target SN feeds back an acknowledgement (ACK) message for the secondary node addition request message to the source MN and starts to perform data forwarding. The ACK message carries data forwarding address information and RRC reconfiguration information.

Step 7: the source MN instructs the source SN to release an RRC connection of the user terminal, and carries a forwarding address at the same time.

Step 8: the source SN returns a secondary node release request acknowledgement ACK message to the source MN and releases the RRC connection of the user terminal.

Step 9: after step 6 is executed, the source MN instructs the user terminal to execute an RRC reconfiguration message.

Step 10: the user terminal returns an RRC reconfiguration completion message to the source MN, and is connected to the target SN.

Step 11: the source MN notifies the target SN that the RRC reconfiguration of the user terminal is completed.

Step 12: after step 7 is executed, the source SN sends a sequence number status to the source MN.

Step 13: after the source MN receives the sequence number status sent by the source SN, the source MN forwards the received sequence number status to the target SN, so that the target SN confirms a current sequence number transmission status of the source SN.

Step 14: the source SN starts data forwarding.

Step 15: after step 10 is executed, the source MN sends a protocol data unit PDU session resource modification instruction to the core network for requesting the core network to convert transmission paths of uplink and downlink user data.

Step 16: the core network returns the PDU session resource modification instruction to the source MN to confirm that the transmission paths of the uplink and downlink user data have been converted.

Step 17: after step 15 is executed, the core network converts the transmission path of the downlink user data, and sends an end identifier to the source SN at the same time.

Step 18: the source SN forwards a forwarding end identifier to the target SN.

Step 19: after step 10 is executed, the target SN instructs the source SN to release a user terminal context, and the source SN releases the user terminal context after data forwarding is completed.

Step 20: the user terminal is in a dual connectivity state, and exchanges data with the core network through the source MN and the target SN.

Scenario 2, the first radio access network node triggers the handover of the second radio access network node to the third radio access network node, the first data of the second radio access network node and/or the second data of the first radio access network node are forwarded to the third radio access network node.

In this case, both the first radio access network node and the second radio access network node where the terminal is located are switched to the third radio access network node, and the third interface message includes the following two parts.

1) first RRC configuration information in the second interface message, and the first data forwarding and distribution information used for indicating first data that needs data forwarding.

2) second RRC configuration information of the first radio access network node, and second data forwarding and distribution information used for indicating second data in the first radio access network node that needs data forwarding.

Optionally, the third interface message further includes: a mapping relationship between a second data flow and a DRB.

In scenario 2, optionally, the above third interface message includes: 3) a mapping relationship between a first data flow and the DRB; and 4) a mapping relationship between the second data flow and the DRB.

The first radio access network node requests the third radio access network node to receive the first data forwarded from the second radio access network node, the method further includes: forwarding the second data of the first radio access network node to the third radio access network node.

In scenario 2, the data forwarded to the third radio access network node includes the following two parts.

1) The first data forwarding and distribution information of the first data.

2) The second data forwarding and distribution information of the second data.

The requesting the third radio access network node to receive the first data forwarded from the second radio access network node includes: according to the mapping relationship between the second data and the DRB, the first radio access network node executes data forwarding of the second data from the first radio access network node to the third radio access network node at granularity of the DRB.

The executing the data forwarding of the second data from the first radio access network node to the third radio access network node includes: the first radio access network node receives a fourth interface message carrying forwarding address information returned by the third access network node; and the first radio access network node forwards the second data to the third radio access network node according to the forwarding address information.

After the first radio access network node receives the fourth interface message carrying the forwarding address information returned by the third access network node, the method further includes: the first radio access network node instructs the second radio access network node to release the RRC connection of the user terminal, and performs RRC reconfiguration to connect the user terminal to the second radio access network node.

After the first radio access network node requests the second radio access network node to release the RRC connection of the user terminal, the following is further included: the first radio access network node sends a sending sequence number status of the first data and a sending sequence number status of the second data to the third radio access network node; and afterwards, the first radio access network node executes data forwarding of the first data from the second radio access network node to the third radio access network node, and executes data forwarding of the second data from the second radio access network node to the first radio access network node.

After the first radio access network node executes data forwarding of the first data from the second radio access network node to the third radio access network node, and executes data forwarding of the second data from the second radio access network node to the first radio access network node, the following is further included: the first radio access network node requests the core network to convert transmission paths of uplink and downlink user data.

After the first radio access network node requests the core network to convert transmission paths of uplink and downlink user data, the following is further included: after receiving a first end identifier sent by the core network, the first radio access network node forwards the first end identifier to the third radio access network node; and when receiving context date of the user terminal released as instructed by the third radio access network node, the first radio access network node instructs the second radio access network node to release context data of the user terminal, and releases the context of the user terminal after completing data forwarding.

The user terminal exchanges data with the core network through the third radio access network node.

The processes of the above scenario 2 will be described in detail below in conjunction with specific application scenarios.

Figure 3:
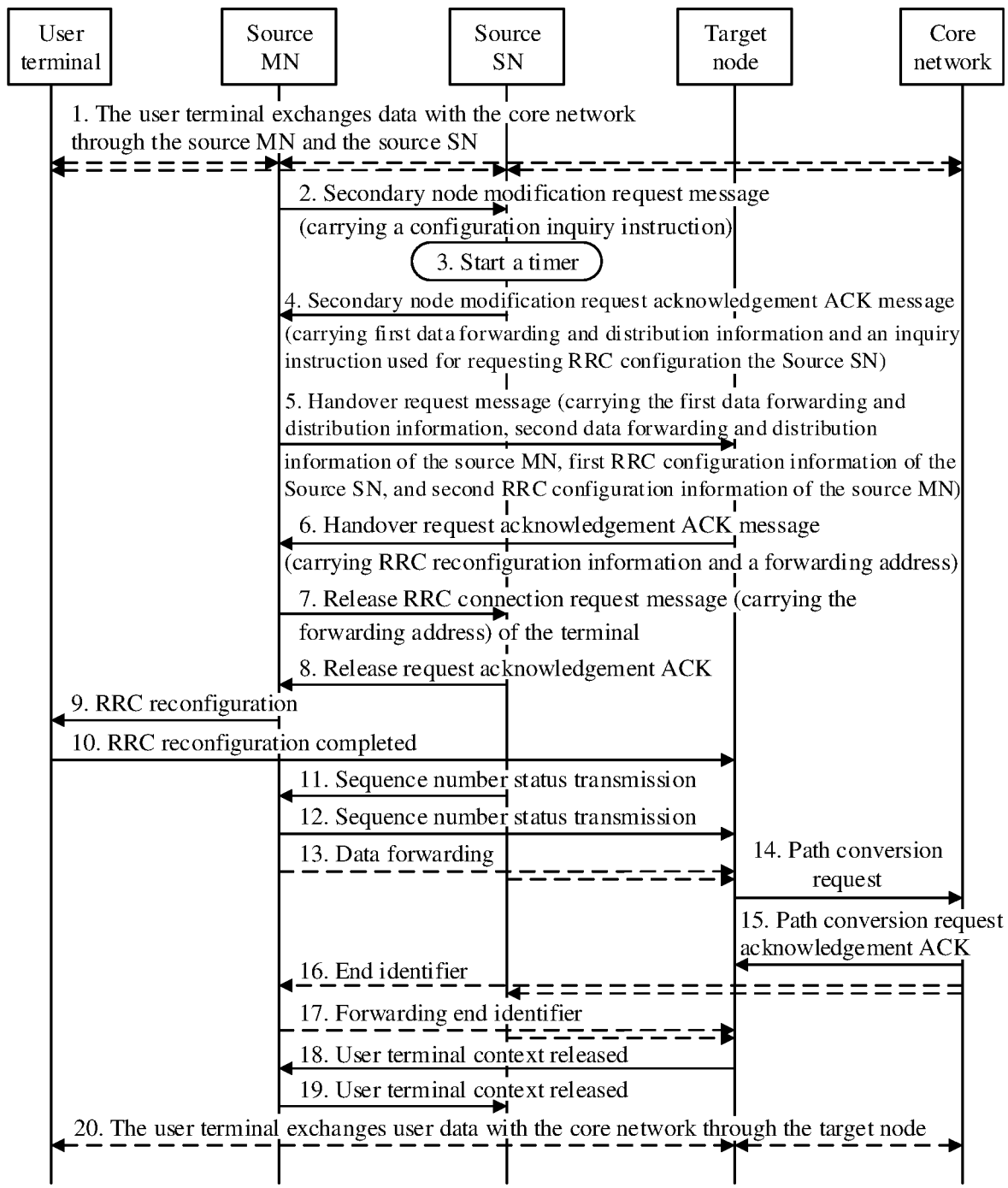
FIG. 3 is a flow diagram of data forwarding in a second scenario provided by an embodiment of the present application.

As shown in FIG. 3, the first radio access network node is the source MN, the second radio access network node is the source SN, the third radio access network node is the target SN, and the system further includes the user terminal and the core network.

In an application scenario, the source MN and the SN where the user terminal is located are changed to the target SN.

Step 1: the user terminal is in a dual connectivity state, and exchanges data with the core network through the source MN and the source SN.

Step 2: the source MN triggers handover to a target node different from the source MN and the source SN, and the source MN sends a secondary node modification request message to the source SN to request the source SN to switch to the target node. The secondary node modification request message carries a configuration inquiry instruction for inquiring about current RRC configuration of the source SN. The configuration inquiry instruction is an SCG configuration inquiry instruction.

Step 3: optionally, when the source SN receives the above-mentioned secondary node modification request message, a timer is started, and the configuration of the source SN is no longer changed before the timer expires.

Step 4: when the source SN receives the above-mentioned secondary node modification request message, the source SN feeds back an acknowledgement (ACK) message for the secondary node modification request message to the source MN. The ACK message carries the first data forwarding and distribution information and RRC configuration information of the source SN.

The data forwarding and distribution information indicates which user data flow needs data forwarding under the condition that data forwarding can be performed. The data forwarding and distribution information further carries the mapping relationship between the data flow and the radio bearer, which is used to indicate data forwarding of the data flow to be executed at granularity of DRB.

Step 5: the source MN sends a handover request message to the target node to switch the source SN where the user terminal is located to the target node. The handover request message carries the first data forwarding and distribution information received by the source MN in step 4 and first RRC configuration information of the source SN as well as second data forwarding and distribution information sent by the source MN and second RRC configuration information of the source MN.

Step 6: the target SN feeds back and acknowledgement (ACK) message for the (secondary node) handover request message to the source MN, and starts to perform data forwarding. The ACK message carries data forwarding address information as well as RRC reconfiguration information.

Step 7: the source MN instructs the source SN to release an RRC connection of the user terminal, and carries the forwarding address at the same time.

Step 8: the source SN returns a release request acknowledgement ACK message to the source MN and releases the RRC connection of the user terminal.

Step 9: after step 6 is executed, the source MN instructs the user terminal to execute an RRC reconfiguration message.

Step 10: after completion of RRC reconfiguration of the user terminal completes, the user terminal switches to the target node.

Step 11: after step 7 is executed, the source SN sends a sequence number status to the source MN.

Step 12: after the source MN receives the sequence number status sent by the source SN, the source MN forwards the received sequence number status to the target node and sends a sequence number status of the source MN to the target node at the same time, so that the target node confirms a current sequence number transmission status of the source SN.

Step 13: the source SN starts data forwarding.

Step 14: after step 10 is executed, the target node sends a path conversion request message to the core network to request the core network to convert transmission paths of uplink and downlink user data.

Step 15: the core network returns a path conversion request acknowledgement ACK message to the target node to confirm that the transmission paths of the uplink and downlink user data have been converted.

Step 16: after step 14 is executed, the core network converts the transmission path of the downlink user data, and sends an end identifier to the source MN and the source SN at the same time.

Step 17: the source MN and the source SN forward a forwarding end identifier to the target node respectively.

Step 18: after step 10 is executed, the target node instructs the source MN to release context data of the user terminal.

Step 19: the source MN instructs the source SN to release context data of the user terminal.

The source MN and the source SN release their respective context data of the user terminal after completion of data forwarding.

Step 20: the user terminal exchanges data with the core network.

Figure 4:
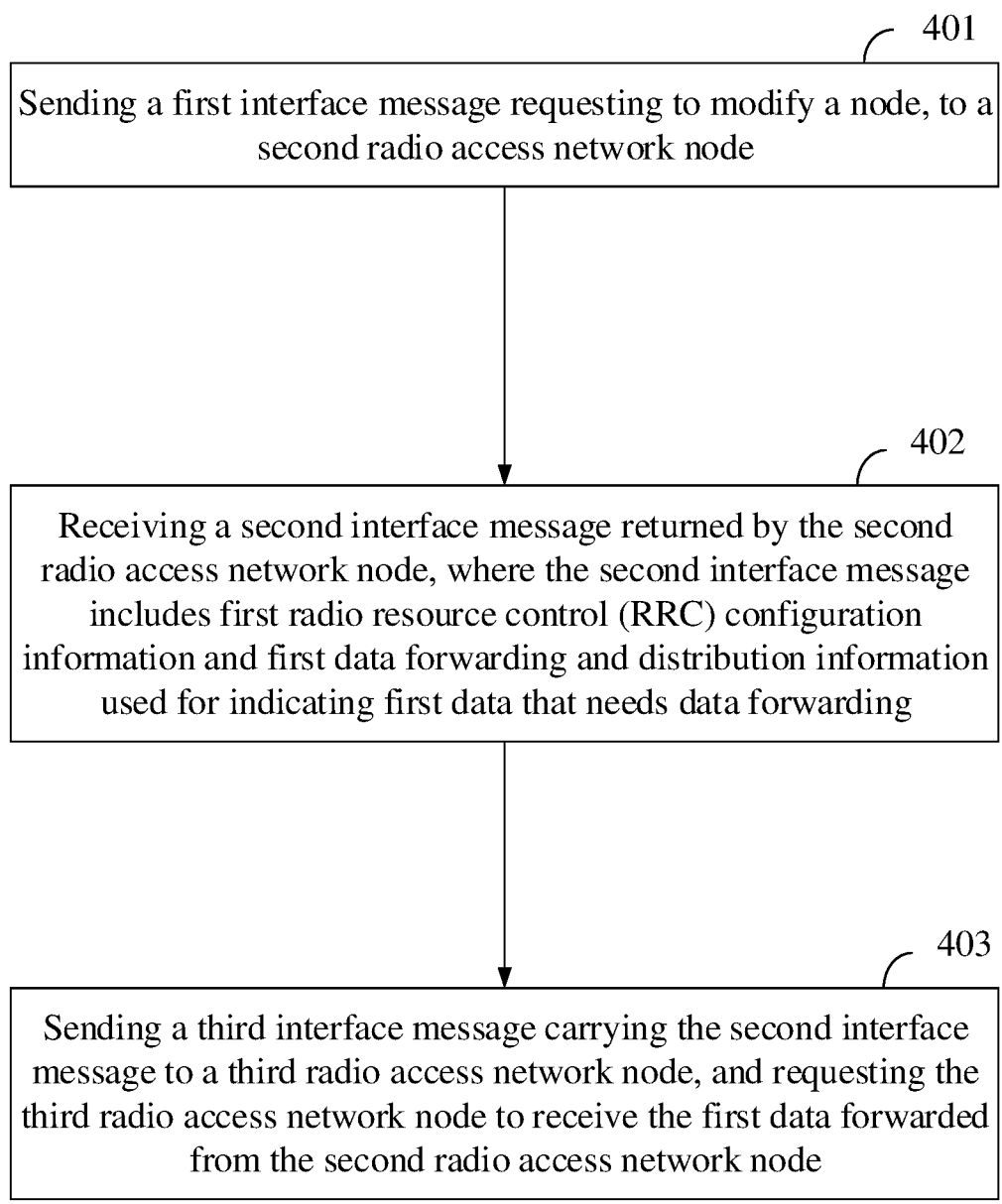
FIG. 4 is a flow diagram of a method for data forwarding provided by an embodiment of the present application.

As shown in FIG. 4, an embodiment of the present application provides a method for data forwarding. The method is applicable to a first radio access network node and includes the following steps.

Step 401: a first interface message requesting to modify the node is sent to a second radio access network node.

Step 402: a second interface message returned by the second radio access network node is received. The second interface message includes first radio resource control (RRC) configuration information and first data forwarding and distribution information used for indicating first data that needs data forwarding.

Step 403: a third interface message carrying the second interface message is sent to a third radio access network node to request the third radio access network node to receive the first data forwarded from the second radio access network node.

As an optional implementation, the second interface message further includes a mapping relationship between the first data and a data radio bearer (DRB).

As an optional implementation, the requesting the third radio access network node to receive the first data forwarded from the second radio access network node includes: the third radio access network node is requested to, according to the mapping relationship between the first data and the DRB, receive the first data forwarded from the second radio access network node at the granularity of the DRB.

As an optional implementation, the requesting the third radio access network node to receive the first data forwarded from the second radio access network node includes: a fourth interface message carrying forwarding address information returned by the third access network node is received; and the forwarding address information is sent to the second radio access network node through a fifth interface message, and the first data is received from the second radio access network node and is forwarded to the third radio access network node.

As an optional implementation, the first interface message includes a configuration inquiry instruction for requesting current RRC configuration of the second radio access network node.

Figure 5:
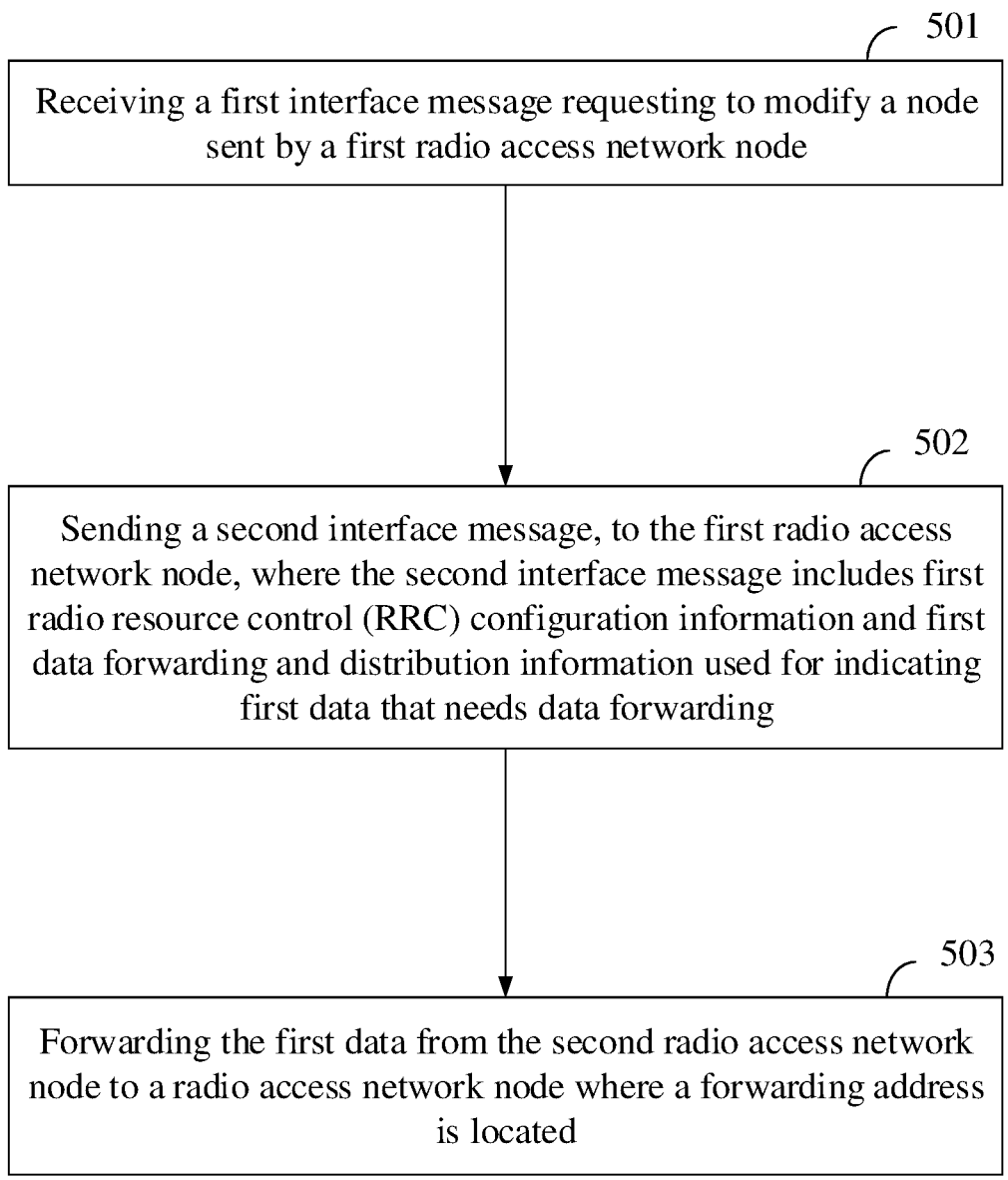
FIG. 5 is a flow diagram of another method for data forwarding provided by an embodiment of the present application.

As shown in FIG. 5, an embodiment of the present application provides a method for data forwarding. The method is applicable to a second radio access network node and includes the following steps.

Step 501: a first interface message, sent by a first radio access network node, requesting to modify the node is received.

Step 502: a second interface message is sent to the first radio access network node. The second interface message includes first radio resource control (RRC) configuration information and first data forwarding and distribution information used for indicating first data that needs data forwarding.

Step 503: data forwarding of the first data from the second radio access network node to a radio access network node where a forwarding address is located is executed.

As an optional implementation, the second interface message further includes a mapping relationship between the first data and a data radio bearer (DRB).

As an optional implementation, the executing data forwarding of the first data from the second radio access network node to the radio access network node where the forwarding address is located includes: data forwarding of the first data from the second radio access network node to the radio access network node where the forwarding address is located is executed according to the mapping relationship between the first data and the DRB.

As an optional implementation, the executing data forwarding of the first data from the second radio access network node to the radio access network node where the forwarding address is located includes: a fifth interface message containing forwarding address information sent by the first radio access network node is received; and data forwarding of the first data from the second radio access network node to the radio access network node where the forwarding address is located is executed according to the forwarding address information.

As an optional implementation, the first interface message includes a configuration inquiry instruction for requesting current RRC configuration of the second radio access network node.

Embodiment 2

Based on the same inventive concept, an embodiment of the present application further provides a device for data forwarding, where the device is a device where a first radio access network node is located. Because the device is a device in a method in an embodiment of the present application and the principle of problem solving of the device is similar to the method, for implementation of the device, reference may be made to implementation of the method, and repetition will not be made here.

The device includes: a processor and a memory, where the memory stores program codes, and when the program codes are executed by the processor, the processor is configured to execute the following steps.

The first interface message requesting to modify the node is sent to a second radio access network node.

A second interface message returned by the second radio access network node is received, where the second interface message includes first radio resource control (RRC) configuration information and first data forwarding and distribution information used for indicating first data that needs data forwarding.

A third interface message carrying the second interface message is sent to a third radio access network node to request the third radio access network node to receive the first data forwarded from the second radio access network node.

As an optional implementation, the second interface message further includes a mapping relationship between the first data and a data radio bearer (DRB).

As an optional implementation, the processor is further configured to: request the third radio access network node to, according to the mapping relationship between the first data and the DRB, receive the first data forwarded from the second radio access network node at the granularity of the DRB.

As an optional implementation, the processor is further configured to: receive a fourth interface message carrying forwarding address information returned by the third access network node; and send the forwarding address information to the second radio access network node through a fifth interface message, and receive the first data from the second radio access network node and forward the same to the third radio access network node.

As an optional implementation, the first interface message includes a configuration inquiry instruction for requesting current RRC configuration of the second radio access network node.

An embodiment of the present application further provides a device for data forwarding, where the device is a device where a second radio access network node is located and the device includes: a processor and a memory, where the memory stores program codes, and when the program codes are executed by the processor, the processor is configured to execute the following steps.

A first interface message, sent by a first radio access network node, requesting to modify the node is received.

A second interface message is sent to the first radio access network node. The second interface message includes first radio resource control (RRC) configuration information and first data forwarding and distribution information used for indicating first data that needs data forwarding.

Data forwarding of the first data from the second radio access network node to a radio access network node where a forwarding address is located is executed.

As an optional implementation, the second interface message further includes a mapping relationship between the first data and a data radio bearer (DRB).

As an optional implementation, the processor is further configured to: execute data forwarding of the first data from the second radio access network node to the radio access network node where the forwarding address is located according to the mapping relationship between the first data and the DRB.

As an optional implementation, the processor is further configured to: receive a fifth interface message containing forwarding address information sent by the first radio access network node; and execute data forwarding of the first data from the second radio access network node to the radio access network node where the forwarding address is located according to the forwarding address information.

As an optional implementation, the first interface message includes a configuration inquiry instruction for requesting current RRC configuration of the second radio access network node.

Embodiment 3

Based on the same inventive concept, an embodiment of the present application further provides a device for data forwarding, where the device is a device where a first radio access network node is located. Because the device is a device in a method in an embodiment of the present application and the principle of problem solving of the device is similar to the method, for implementation of the device, reference may be made to implementation of the method, and repetition will not be made here.

Figure 6:
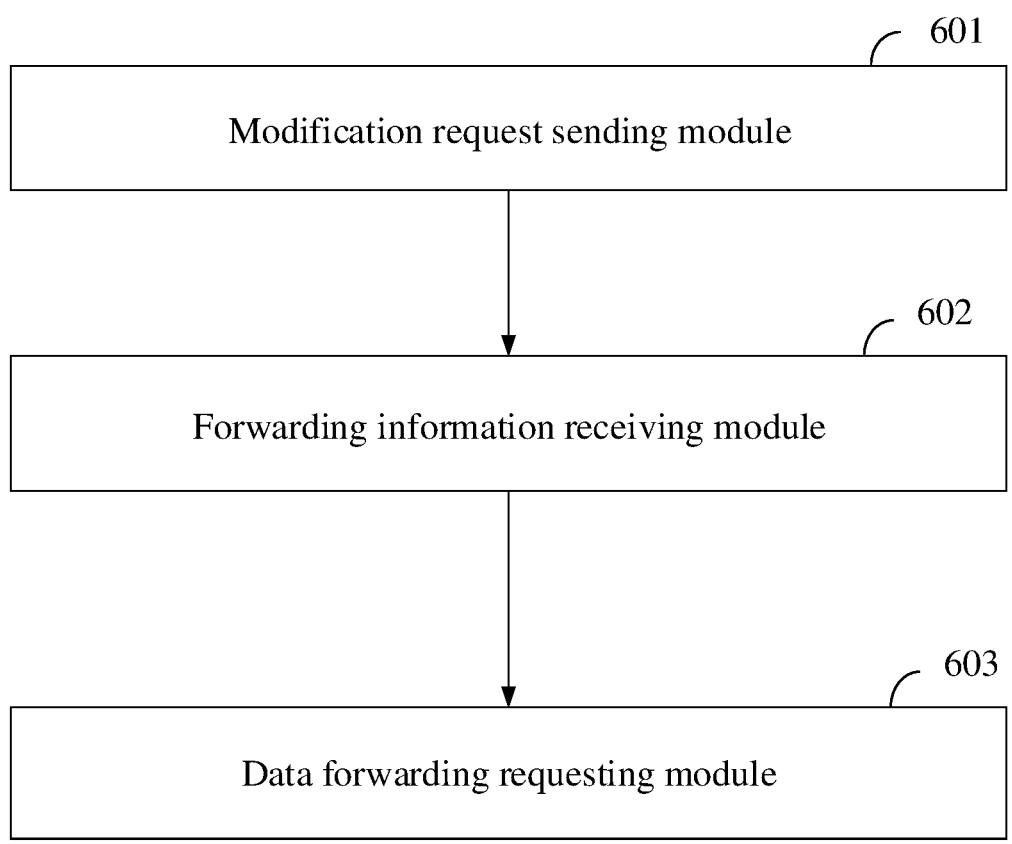
FIG. 6 is a schematic diagram of a device for data forwarding provided by an embodiment of the present application.

As shown in FIG. 6, the device includes: a modification request sending module 601, a forwarding information receiving module 602 and a data forwarding requesting module 603.

The modification request sending module 601 is configured to send, to a second radio access network node, a first interface message requesting to modify the node.

The forwarding information receiving module 602 is configured to receive a second interface message returned by the second radio access network node. The second interface message includes first radio resource control (RRC) configuration information and first data forwarding and distribution information used for indicating first data that needs data forwarding.

The data forwarding requesting module 603 is configured to send, to a third radio access network node, a third interface message carrying the second interface message, to request the third radio access network node to receive the first data forwarded from the second radio access network node.

As an optional implementation, the second interface message further includes a mapping relationship between the first data and a data radio bearer (DRB).

As an optional implementation, the data forwarding requesting module 603 is specifically configured to: request the third radio access network node to, according to the mapping relationship between the first data and the DRB, receive the first data forwarded from the second radio access network node at the granularity of the DRB.

As an optional implementation, the data forwarding requesting module 603 is further configured to: receive a fourth interface message carrying forwarding address information returned by the third access network node; and send the forwarding address information to the second radio access network node through a fifth interface message, and receive the first data from the second radio access network node and forward the same to the third radio access network node.

As an optional implementation, the first interface message includes a configuration inquiry instruction for requesting current RRC configuration of the second radio access network node.

Figure 7:
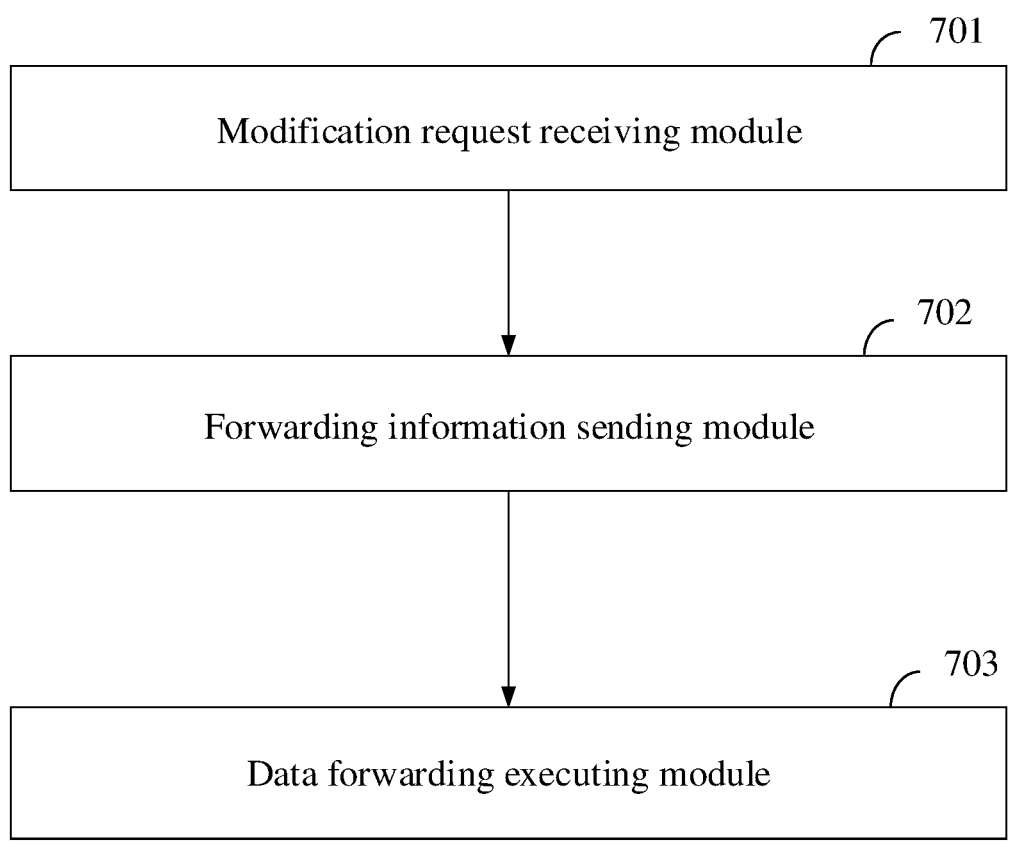
FIG. 7 is a schematic diagram of another device for data forwarding provided by an embodiment of the present application.

As shown in FIG. 7, an embodiment of the present application provides a device for data forwarding. The device is a device where a second radio access network node is located and the device includes: a modification request receiving module 701, a forwarding information sending module 702 and a data forwarding executing module 703.

The modification request receiving module 701 is configured to receive a first interface message, sent by a first radio access network node, requesting to modify the node.

The forwarding information sending module 702 is configured to send, to the first radio access network node, a second interface message. The second interface message includes first radio resource control (RRC) configuration information and first data forwarding and distribution information used for indicating first data that needs data forwarding.

The data forwarding executing module 703 is configured to execute data forwarding of the first data from the second radio access network node to a radio access network node where a forwarding address is located.

As an optional implementation, the second interface message further includes a mapping relationship between the first data and a data radio bearer (DRB).

As an optional implementation, the data forwarding executing module 703 is further configured to: execute data forwarding of the first data from the second radio access network node to a radio access network node where a forwarding address is located according to the mapping relationship between the first data and the DRB.

As an optional implementation, the data forwarding executing module 703 is further configured to: receive a fifth interface message containing forwarding address information sent by the first radio access network node; and execute data forwarding of the first data from the second radio access network node to the radio access network node where the forwarding address is located according to the forwarding address information.

As an optional implementation, the first interface message includes a configuration inquiry instruction for requesting current RRC configuration of the second radio access network node.

Embodiment 4

An embodiment of the present application further provides a computer-readable nonvolatile storage medium, where the computer-readable nonvolatile storage medium includes program codes, and when the program codes run on a computing terminal, the program codes are used for enabling the computing terminal to execute the following steps.

A first interface message requesting to modify the node is sent to a second radio access network node.

A second interface message returned by the second radio access network node is received. The second interface message includes first radio resource control (RRC) configuration information and first data forwarding and distribution information used for indicating first data that needs data forwarding.

A third interface message carrying the second interface message is sent to a third radio access network node to request the third radio access network node to receive the first data forwarded from the second radio access network node.

An embodiment of the present application further provides a computer-readable nonvolatile storage medium, where the computer-readable nonvolatile storage medium includes program codes, and when the program codes run on a computing terminal, the program codes are used for enabling the computing terminal to execute the following steps.

A first interface message, sent by a first radio access network node, requesting to modify the node is received.

A second interface message is sent to the first radio access network node, where the second interface message includes first radio resource control (RRC) configuration information and first data forwarding and distribution information used for indicating first data that needs data forwarding.

Data forwarding of the first data from the second radio access network node to a radio access network node where a forwarding address is located is executed.

Those of skill in the art should understand that, the embodiments of the present application may be provided as a method, a system or a computer program product. Therefore, the present application may adopt the form of a complete hardware embodiment, a complete software embodiment, or an embodiment combining software and hardware. Moreover, the present application may take the form of a computer program product implemented on one or more computer-usable storage media (including but not limited to a disk memory, an optical memory, etc.) containing computer-usable program codes.

The present application is described with reference to a flowchart and/or a block diagram of a method, equipment (a system), and a computer program product according to the embodiments of the present application. It should be understood that each flow and/or block in the flowchart and/or the block diagram, and the combination of the flows and/or the blocks in the flowchart and/or the block diagram may be realized by computer program instructions. These computer program instructions may be provided for a processor of a general-purpose computer, a special-purpose computer, an embedded processor, or other programmable data processing equipment to generate a machine, so that an apparatus that realizes functions specified in one flow or multiple flows in the flowchart and/or one block or multiple blocks in the block diagram may be generated through the instructions executed by the processor of the computer or other programmable data processing equipment.

These computer program instructions may also be stored in a computer-readable memory that can direct the computer or other programmable data processing equipment to work in a specific mode, so that the instructions stored in the computer-readable memory produce a manufactured product including an instruction apparatus. The instruction device implements functions specified in one flow or multiple flows in the flowchart and/or one block or multiple blocks in the block diagram.

These computer program instructions may also be loaded on a computer or other programmable data processing equipment so that a series of operation steps are executed on the computer or other programmable equipment to produce computer-implemented processing, so as to provide steps for implementing functions specified in one flow or multiple flows in the flowchart and/or one block or multiple blocks in the block diagram through the instructions executed on the computer or other programmable equipment.

Apparently, those of skill in the art may make various changes and modifications to the present application without departing from the spirit and scope of the present application. In this way, if these modifications and variations of the present application fall within the scope of the claims of the present application and their equivalent technologies, the present application is also intended to include these modifications and variations.

What is claimed is:

1. A method for data forwarding, applied to a first radio access network node and comprising:
    sending, a first interface message requesting to modify a node, to a second radio access network node;
    receiving a second interface message returned by the second radio access network node, wherein the second interface message comprises first radio resource control (RRC) configuration information and first data forwarding and distribution information, and the first data forwarding and distribution information indicates first data that needs data forwarding, and the first data is a user data flow which needs data forwarding under a condition that data forwarding is able to be performed; and
    sending a third interface message carrying the first RRC configuration information and the first data forwarding and distribution information to a third radio access network node, and requesting the third radio access network node to receive the first data forwarded from the second radio access network node;
    wherein the first interface message comprises a configuration inquiry instruction for requesting current RRC configuration of the second radio access network node.

2. The method according to claim 1, wherein the second interface message further comprises a mapping relationship between the first data and a data radio bearer (DRB).

3. The method according to claim 2, wherein the requesting the third radio access network node to receive the first data forwarded from the second radio access network node comprises:
    requesting the third radio access network node to receive the first data forwarded from the second radio access network node at granularity of the DRB according to the mapping relationship between the first data and the DRB.

4. The method according to claim 1, wherein the requesting the third radio access network node to receive the first data forwarded from the second radio access network node comprises:
    receiving a fourth interface message carrying forwarding address information returned by the third access network node;
    sending the forwarding address information to the second radio access network node through a fifth interface message;
    receiving the first data from the second radio access network node; and
    forwarding the received first data to the third radio access network node.

5. A method for data forwarding, applied to a second radio access network node and comprising:
    receiving a first interface message requesting to modify a node, sent by a first radio access network node;
    sending a second interface message to the first radio access network node, wherein the second interface message comprises first radio resource control (RRC) configuration information and first data forwarding and distribution information, and the first data forwarding and distribution information indicates first data that needs data forwarding, and the first data is a user data flow which needs data forwarding under a condition that data forwarding is able to be performed; and
    forwarding the first data from the second radio access network node to a radio access network node where a forwarding address is located;
    wherein the first interface message comprises a configuration inquiry instruction for requesting current RRC configuration of the second radio access network node.

6. The method according to claim 5, wherein the second interface message further comprises a mapping relationship between the first data and a data radio bearer (DRB).

7. The method according to claim 6, wherein the forwarding the first data from the second radio access network node to the radio access network node where the forwarding address is located comprises:
    forwarding the first data from the second radio access network node to the radio access network node where the forwarding address is located at granularity of the DRB according to the mapping relationship between the first data and the DRB.

8. The method according to claim 5, wherein the forwarding the first data from the second radio access network node to the radio access network node where the forwarding address is located comprises:
    receiving a fifth interface message containing forwarding address information sent by the first radio access network node; and
    forwarding the first data from the second radio access network node to the radio access network node where the forwarding address is located according to the forwarding address information.

9. A device for data forwarding, wherein the device is a device where a first radio access network node is located and the device comprises: a processor and a memory, and the processor is configured to execute program codes stored in the memory to:
    send a first interface message requesting to modify a node to a second radio access network node;
    receive a second interface message returned by the second radio access network node, wherein the second interface message comprises first radio resource control (RRC) configuration information and first data forwarding and distribution information, and first data forwarding and distribution information indicates first data that needs data forwarding, and the first data is a user data flow which needs data forwarding under a condition that data forwarding is able to be performed; and
    send a third interface message carrying the first RRC configuration information and the first data forwarding and distribution information to a third radio access network node, and request the third radio access network node to receive the first data forwarded from the second radio access network node;
    wherein the first interface message comprises a configuration inquiry instruction for requesting current RRC configuration of the second radio access network node.

10. The device according to claim 9, wherein the second interface message further comprises a mapping relationship between the first data and a data radio bearer (DRB).

11. The device according to claim 10, wherein the processor is further configured to:
    request the third radio access network node to receive the first data forwarded from the second radio access network node at granularity of the DRB according to the mapping relationship between the first data and the DRB.

12. The device according to claim 9, wherein the processor is further configured to:
receive a fourth interface message carrying forwarding address information returned by the third access network node;
send the forwarding address information to the second radio access network node through a fifth interface message;
receive the first data from the second radio access network node; and
forward the received first data to the third radio access network node.

13. A device for data forwarding, wherein the device is a device where a second radio access network node is located and the device comprises: a processor and a memory, and the processor is configured to execute program codes stored in the memory to:
receive a first interface message requesting to modify a node, sent by a first radio access network node;
send a second interface message to the first radio access network node, wherein the second interface message comprises first radio resource control (RRC) configuration information and first data forwarding and distribution information, and first data forwarding and distribution information indicates first data that needs data forwarding, and the first data is a user data flow which needs data forwarding under a condition that data forwarding is able to be performed; and forward the first data from the second radio access network node to a radio access network node where a forwarding address is located;
wherein the first interface message comprises a configuration inquiry instruction for requesting current RRC configuration of the second radio access network node.

14. The device according to claim 13, wherein the second interface message further comprises a mapping relationship between the first data and a data radio bearer (DRB).

15. The device according to claim 14, wherein the processor is further configured to:
forward the first data from the second radio access network node to the radio access network node where the forwarding address is located at granularity of the DRB according to the mapping relationship between the first data and the DRB.

16. The device according to claim 13, wherein the processor is further configured to:
receive a fifth interface message containing forwarding address information sent by the first radio access network node; and
forward the first data from the second radio access network node to the radio access network node where the forwarding address is located according to the forwarding address information.

* * * * *